(12) United States Patent
Drudis et al.

(10) Patent No.: US 9,049,029 B2
(45) Date of Patent: Jun. 2, 2015

(54) PROVIDING DIFFERENT NETWORK SERVICES TO A NETWORK AGENT

(75) Inventors: Antoni Drudis, Cupertino, CA (US); Bill Serra, Palo Alto, CA (US); Rafael Luis Brugnini Mallo, Las Rozas (ES)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 2896 days.

(21) Appl. No.: 11/413,550

(22) Filed: Apr. 28, 2006

(65) Prior Publication Data

US 2007/0266167 A1 Nov. 15, 2007

(51) Int. Cl.
*H04M 11/00* (2006.01)
*G06F 9/00* (2006.01)
*G06F 15/16* (2006.01)
*H04L 12/14* (2006.01)

(52) U.S. Cl.
CPC ............ *H04L 12/14* (2013.01); *H04L 12/1457* (2013.01)

(58) Field of Classification Search
None
See application file for complete search history.

(56) References Cited

U.S. PATENT DOCUMENTS

| 5,682,482 | A | 10/1997 | Burt et al. | |
|---|---|---|---|---|
| 5,854,975 | A * | 12/1998 | Fougnies et al. | 455/408 |
| 6,157,823 | A | 12/2000 | Fougnies | |
| 6,236,851 | B1 | 5/2001 | Fougnies | |
| 6,621,895 | B1 | 9/2003 | Giese | |
| 6,775,701 | B1 | 8/2004 | Pan et al. | |
| 7,120,419 | B2 * | 10/2006 | Batni et al. | 455/406 |
| 7,146,404 | B2 * | 12/2006 | Kay et al. | 709/206 |
| 2001/0021648 | A1 | 9/2001 | Fougnies | |
| 2003/0084171 | A1 * | 5/2003 | de Jong et al. | 709/229 |
| 2003/0233580 | A1 * | 12/2003 | Keeler et al. | 713/201 |
| 2003/0236991 | A1 * | 12/2003 | Letsinger | 713/200 |
| 2004/0143523 | A1 * | 7/2004 | Pegaz-Paquet et al. | 705/34 |
| 2004/0162092 | A1 * | 8/2004 | Marsico et al. | 455/463 |

OTHER PUBLICATIONS

By: Nostocksonlybonds, Long-Term Sentiment: Hold, May 20, 2005, Msg: 8520 of 8533.

* cited by examiner

*Primary Examiner* — William Nealon
(74) *Attorney, Agent, or Firm* — International IP Law Group, P.C.

(57) ABSTRACT

Differing network services can be provided to a single network agent such that a single agent can access services billed to different accounts. Different services and billed to different accounts by the network agent sending a network agent identifier to the network which identifies the agent. After an agent is identified, it sends a service qualifier that identifies a service being requested and an account to which the service should be billed or charged.

30 Claims, 4 Drawing Sheets

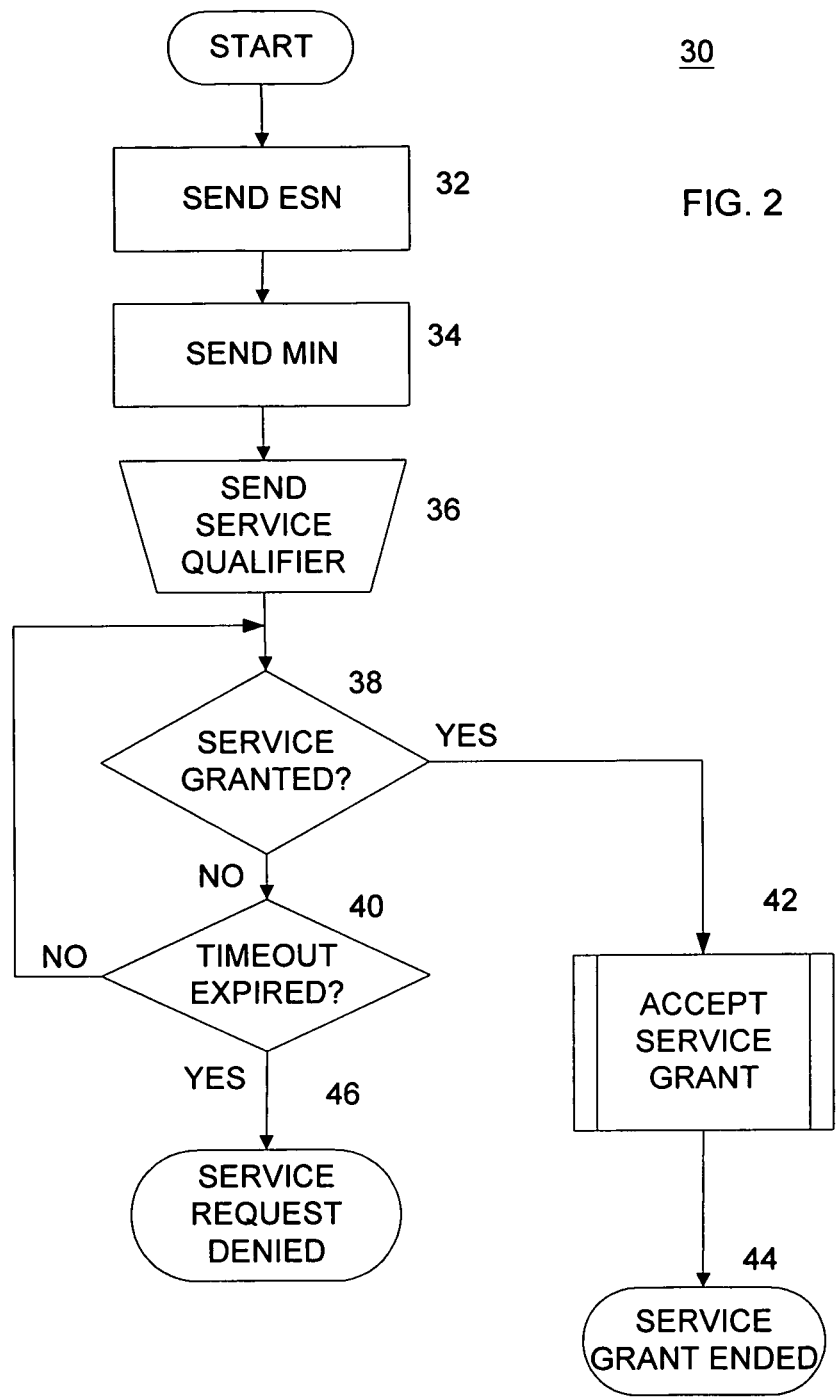

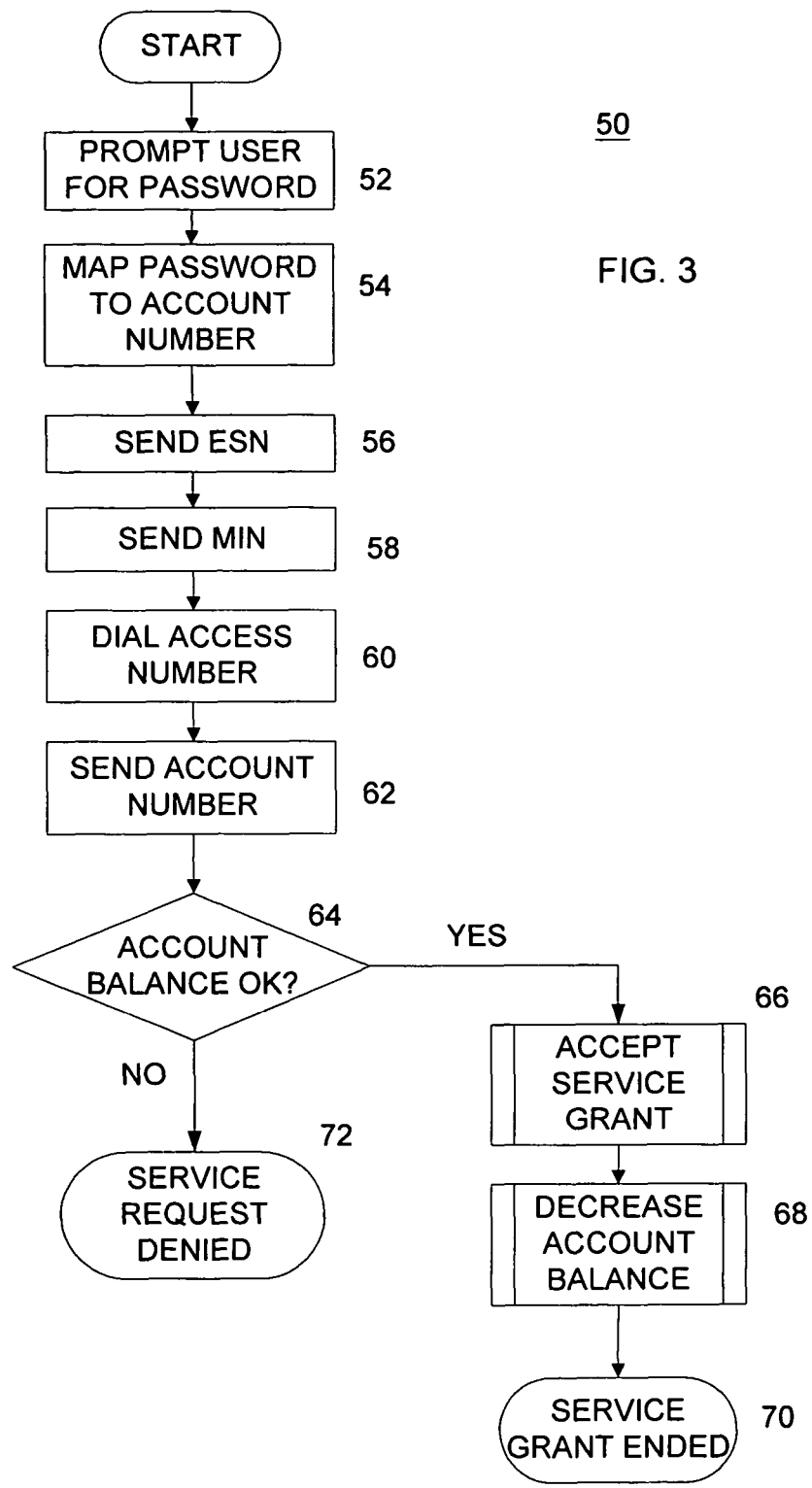

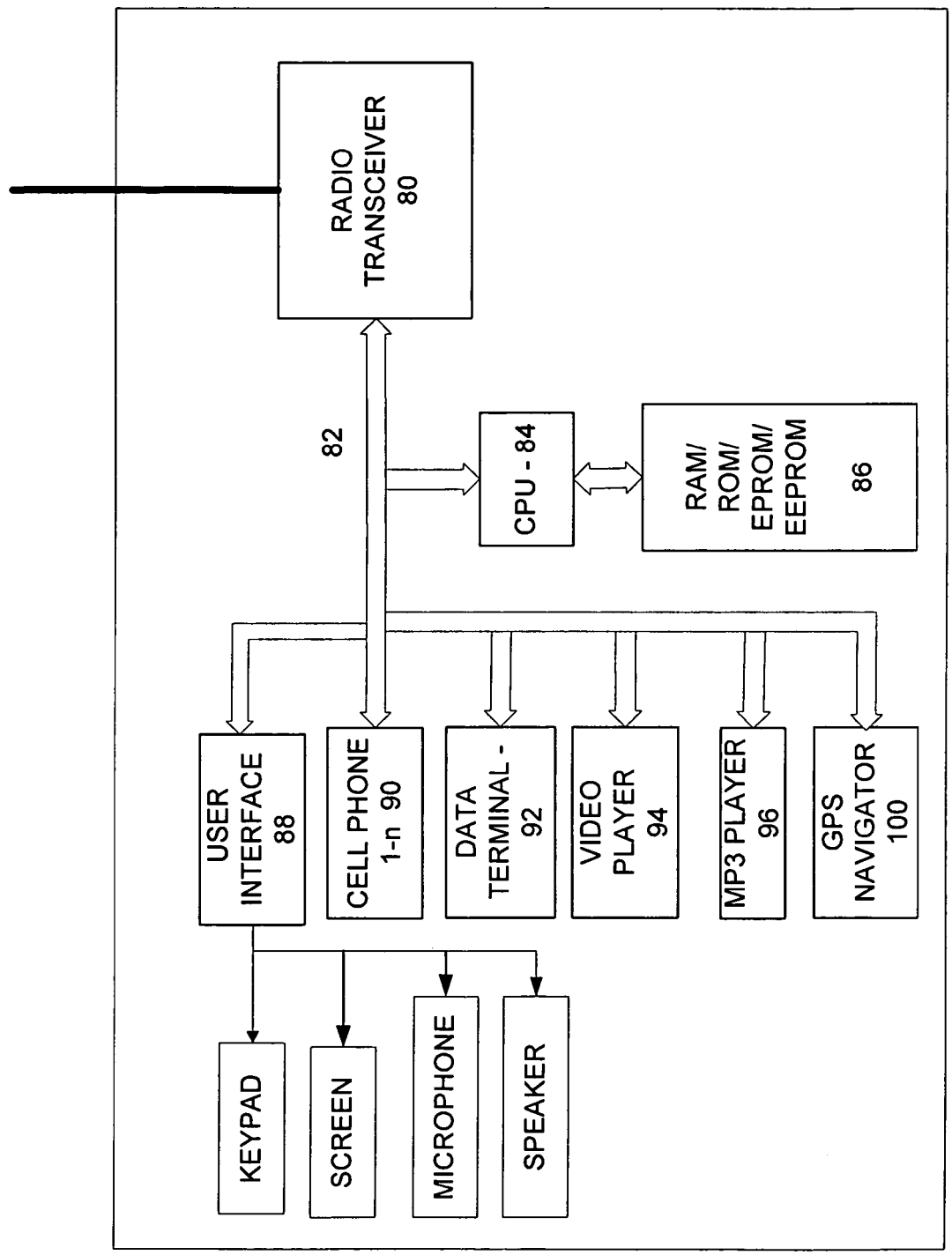

PROVIDING DIFFERENT NETWORK SERVICES TO A NETWORK AGENT

BACKGROUND

When cellular telephone technology first appeared in the United States, voice communication channels carried conventional FM modulated signals. Although cellular networks may still support such legacy technology, virtually all of the cellular telephones in use today and almost all of the cell phones being sold today use one form of digital modulation or another.

The technology switchover from analog to digital modulation techniques such as CDMA and GSM accommodated more users but it also paved the way for more services to be provided than would have been possible using analog modulation. Text messaging, camera phone picture transmissions, wireless Internet access, and MP3 and video downloads have all been made possible by digital data transmission.

The nearly ubiquitous cellular coverage, decreasing air time cost and the decreasing cost of cellular handsets has made cellular communications very popular. Some people now forego traditional wire line phone service in their homes, opting instead to rely on cellular communications.

For a variety of reasons, many people now use cell phones for both business and personal communications. Many people now find it necessary to have one phone for business communications and to have a second phone for personal communications. Some employers discourage the use of business phones for personal uses and most people prefer to keep their personal communications private. While using two or more phones may have advantages, most people prefer to carry fewer devices around with them. Using multiple phones requires that extra hardware must be carried about and secured.

BRIEF DESCRIPTION OF THE DRAWINGS

FIG. 2 is a flow chart showing steps of a method used in a system that provides different network services to a network agent, in accordance with an embodiment;

FIG. 3 is a simplified flow chart of the steps of an alternate method for providing different network services to a network agent, in accordance with an embodiment;

FIG. 4 is a block diagram of a network agent used to receive different network services from a network, in accordance with an embodiment.

DETAILED DESCRIPTION

Figure 1:
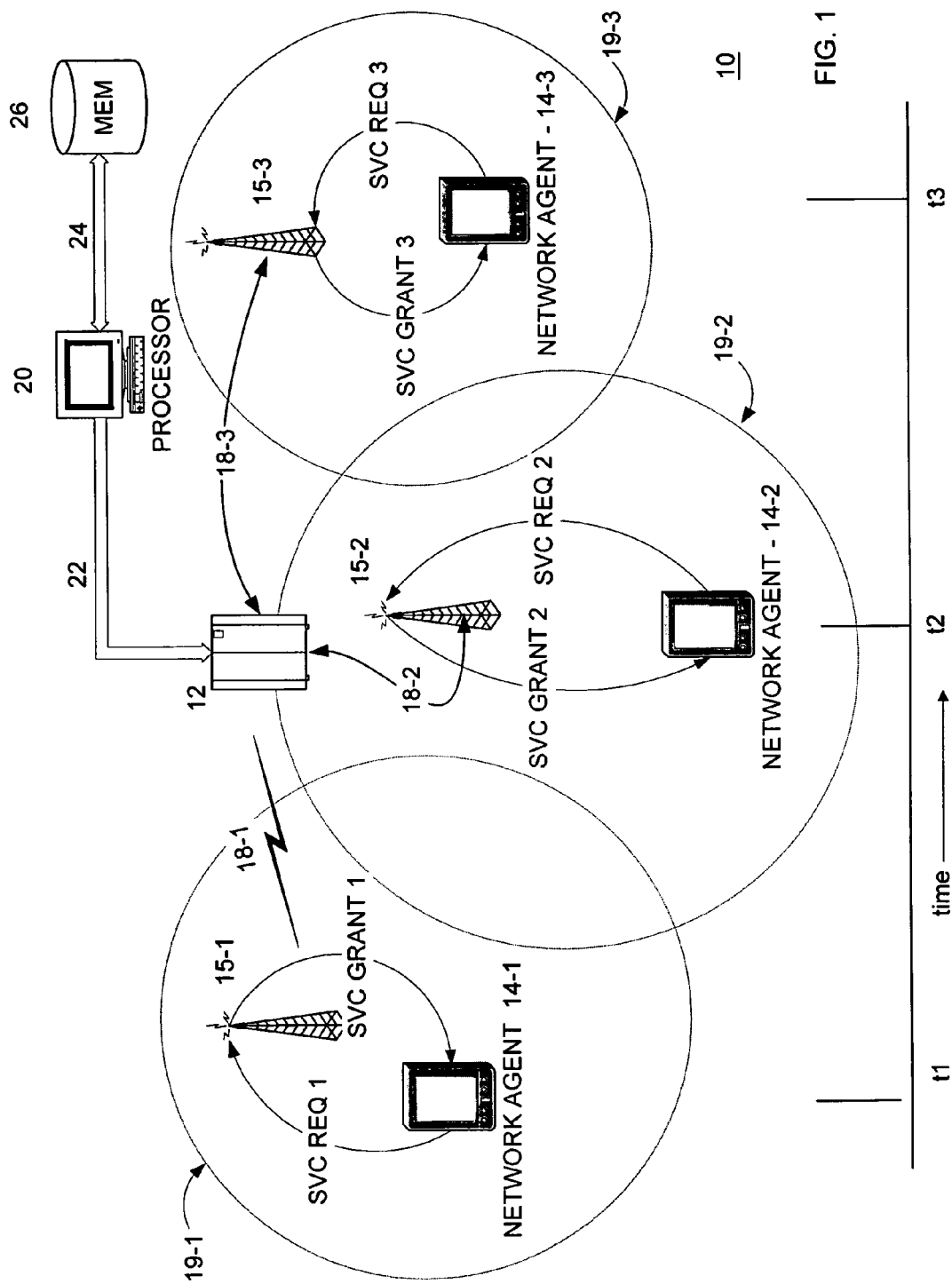
FIG. 1 is a diagram of communications system that provides different network services to a network agent, in accordance with an embodiment.

FIG. 1 is a diagram of communications system 10 that provides different network services to a network agent 14. In an embodiment, the communications system 10 is a cellular telephone network.

A switching system 12 is coupled to and controls several different cell sites 15 (e.g., 15-1, 15-2, 15-3, etc.) of the network 10 through appropriate wireless and wired data links 18 (e.g., 18-1, 18-2, 18-3, etc.). The switching system 12 operates under the control of a computer or processor 20. The switching system 12 and the processor 20 are coupled to each other by an appropriate bus 22. In FIG. 1, the processor 20 is depicted as being coupled to a memory device 26 through a bus 24. Processor 20 executes instructions, which imbue it with certain capabilities and which cause the processor 20 to perform certain control functions over the switching system 12. Since the switching system 12 controls the cell sites 15, the computer program instructions executed by the processor 20 provide capabilities to the network 10.

As known in the cellular telecommunications art, the voice and data that are sent to and received from a network agent 14 within a cell site's coverage area 19 pass through one or more switching systems 12. For simplicity, the network 10 of FIG. 1 shows one switching system 12 controlling the cell site equipment 15, which in turn provides features and capabilities to the network 10 for the network agents 14 to use. Thus, the functionality, features and capabilities of a communications network are enabled or provided by computer program instructions or software, which in the embodiment of FIG. 1, are stored in memory device 26.

In order to enable a single network agent 14 to provide multiple accounts through a single network, the network agent identifies itself to the network and asks or identifies to the network, which account of various accounts that are to be charged by the network for providing a service to the network agent 14. The network agent 14 first sends a "network agent identifier," which is a data or other message that identifies the network agent 14 to the network 10. Thereafter, the network agent 14 sends another data or message that identifies a service to be provided and an account to which it should be billed or charged, thereby enabling one phone to take on the role of several phones, by telling the network 10 to provide service to the phone identified by the network agent identifier and to charge the service to an account identified by the service qualifier.

A network agent 14 may be a cell phone, a wireless laptop, an MP3 player, other subscriber equipment, etc. As illustrated in the embodiment of FIG. 1, a network agent 14 is a cellular telephone. In such an embodiment, the network agent 14 requests service from the cellular network 10 by first sending a mobile identification number (MIN) and an electronic serial number (ESN) to the processor 20 via one of the cell sites 15, from which the ESN and MIN are routed to the switching system 12.

As known in the art of cellular telecommunications, an ESN and MIN are used by a cellular telecommunications system to identify a particular phone. The ESN and MIN also identify the phone as either a known phone or a roaming device. The ESN and MIN are then used to identify a single account to which any subsequently rendered service to the phone is to be billed or charged, regardless of whether the phone is operating in its home system or is roaming.

In accordance with an embodiment, a network agent 14 transmits one or more data items in addition to an ESN and MIN which the network 10 understands to be a request to charge a subsequently rendered service to one or more specific accounts. For example, in FIG. 1, a network agent identifier is sent from the network agent 14 to the switching system 12 together with an additional "service qualifier" before service is granted to the network agent 14. Services granted to the network agent 14, and the account to be charged or billed, are identified to the network by the service qualifier that the network agent 14 sends to the switching system 12. The service qualifier data identifies to the network, services the network agent is entitled to receive.

FIG. 2 is a simplified flow chart of the steps of a method 30 for providing different network services to a network agent 14 embodied as a cellular telephone, in accordance with an embodiment. In steps 32 and 34, the network agent 14 sends (and the network 10 receives) an ESN and MIN from the network agent 14. In step 36, the network agent 14 sends (and the network 10 receives) a "service qualifier" from the network agent 14. In steps 38 and 40, the network agent 14 waits a finite amount of time for a service grant from the network 10. When the time out expires, the service request is considered denied at step 46. When the service grant from the network 10 is received and accepted by the network agent 14 as shown by step 42, the network 10 thereafter provides the service to the network agent 14 and charges or bills the service to a particular account identified to the network 10 by the service qualifier in step 36. The network service is terminated at step 44 when the network agent 14 terminates the session.

Illustration of providing different network services to a network agent is further illustrated in FIG. 1. As can be seen in FIG. 1, a network agent 14 in a first cell coverage area 19-1 places a call at time $t_1$ by sending a service request message SVC REQ 1 to the switching system 12, through one of the cell sites 15. For simplicity, the "service request message" (e.g., SVC REQ 1, SVC REQ 2, SVC REQ3, etc.) is comprised of both the aforementioned "network agent identifier" and "service qualifier." The service request message SVC REQ 1 is sent into the network 10 through a cell site 15-1, for example. As is also shown in FIG. 1, the network agent 14 receives back a network service grant message SVC GRANT 1, by which the network 10 grants network service to the network agent 14. The service granted to the network agent 14 by the network service grant message SVC GRANT 1 is billed by the network 10 to a first account.

Still referring to FIG. 1, e.g., at a later time $t_2$, which, for illustration purposes, is after the network agent 14 has moved into cell coverage area 19-2, the network agent 14 places another call by sending a second service request message SVC REQ 2. For further illustration purposes, at time $t_2$, the second service request message SVC REQ 2 is sent to the switching system 12 through a different cell site, e.g., cell site 15-2. Upon the switching system 12 determination that the network agent 14 is authorized to receive network services, another service grant message, e.g., SVC GRANT 2, is sent to the network agent 14 from cell site 15-2, followed by the provision of services to the network agent 14. The services granted by the second service grant message SVC GRANT 2 can be billed by the network 10 to an account specified in the second service request message SVC GRANT 2 that was sent to the network 10 by the network agent 14 at time $t_2$.

At time $t_3$ the network agent 14, also for illustration purposes, has traveled to yet another service area, e.g., 19-3, wherein it sends in another service request message, e.g., SVC REQ 3. The network 10 then answers the service request message SVC REQ 3 with a third service grant message, e.g., SVC GRANT 3. As with the other service requests, service request message SVC REQ 3 can identify yet another account to which network services provided to the network agent 14 are to be billed by the network 10.

Those of ordinary skill in the art will recognize that messages to a service qualifier could take many forms. The service qualifier can include days of the week, months of the year, time of day, etc. It could be a geographic location; a telephone number being called; a network service being requested or an account balance, etc. It could also be one or more numbers provided from a cell phone's keypad as well as recognized speech.

In addition to identifying an account to be billed for a service that is requested, the service qualifier message can also include data that identifies, to the network 10, the account balance of one or more accounts to which a service is to be filled. An account balance can be identified by data that identifies the value of services to be provided or a tally of air time that has been provided, etc.

FIG. 3 shows the steps of an alternate method 50 for providing different network services to a network agent 14 embodied as a cellular telephone. In step 52, the network agent 14 prompts a user to provide a password to the network agent 14. Those of ordinary skill in the art will recognize that the password varies and includes, for example, a series of digits, recognized speech, a recognizable biometric feature of a user, other data or information, etc.

In step 54, the network agent 14 maps the password received from the user to a particular account, which can identify both a service to be provided and how the service is to be paid for. Thus, in step 54, the network agent 14 cross-references a password to an account to which a service is to be charged.

Once an account is identified by the network agent 14 in step 54, in steps 56 and 58, the network agent 14 provides, to the network 10, a network agent identifier, which in a cellular telephone network is embodied as a handset's ESN and MIN. Presuming that the network 10 recognizes the ESN and MIN, in step 60, the network agent's user then dials an access number, such as the toll-free number of a telecommunications service provider.

After the call to the access number is answered, which can be indicated for example by one or more in-band tones that are sent to the network agent 14 through the network 10, the network agent 14 thereafter sends a "service qualifier" to the network 10. In the method embodiment of FIG. 3, the service qualifier sent in step 62 is the account number that was determined in step 54 from a password entered into the network agent 14. Thus, a service qualifier is determined by the network agent 14 from a password that a user provided to the network agent 14. A service qualifier can also be embodied as one or more DTMF tones; one or more words that are spoken by a user of a network agent and recognized by either the network agent 14 of the network 10; one or more alphanumeric characters entered into a keypad on the network agent 14; a time of day; a day of the week; a geographic location as determined by an ancillary GPS navigation device 100 within the network agent 14; a telephone number being called; a network service being requested; an account balance, etc.

When the network 10 receives an account number (i.e., a service qualifier) from the network agent 14, the network 10 checks the account number as to whether or not the account is valid. The step of checking an account's validity can be performed as part of the account's balance check shown in step 64. In step 64, the account's balance is checked as to whether sufficient funds are available in the account to complete the call. If an account balance is determined to exist in step 64, the network agent 14 accepts a service grant in step 66. Thereafter, in step 68, the account "balance" is decremented or otherwise adjusted to reflect the service that was granted in step 66. The account balance can be kept within the network agent 14 or within the network 10. If the result of step 64 is a determination that there is no account balance or an inadequate account balance, the service request is denied in step 72. Thus, FIG. 3 depicts a method 50 of providing different network services to a network agent wherein a single network agent 14 is provided different network services whereby the determination of a service to be provided is determined by the network agent mapping a password or other identifier it received to a particular account number. An account number then determines a service to be provided to the network agent.

The network services provided to a network agent 14 and identified by a service qualifier include but are not limited to two-way telecommunications services such as cellular telephone service, Internet access, and instant messaging service, etc. The services could also include MP3 and video downloads, GPS locating and paging services, and the like.

Referring now to FIG. 4 there is shown a block diagram of one implementation of a network agent 14. As can be seen in this figure, the network agent 14 includes circuitry for providing different services. Since the network agent is intended to operate in a wireless network, it includes a radio transceiver 80 by which wireless communications with a network is supported.

The radio transceiver 80 is coupled to and controlled by a computer or processor, i.e., CPU 84 through a bus 82. The CPU 84 executes program instructions that imbue the CPU 84 with functionality to control the various peripheral devices, which include the radio transceiver 80 and personality circuitry, i.e., hardware and other circuitry that imbue the network agent 14 with various "personalities" such as the personality of a cell phone 90, a personal computer or data terminal 92, a video player 94, an MP3 player 96, a GPS receiver 98, etc.

A user interface 88 is also coupled to the CPU 84 via the bus 82, the nature of which may vary depending on which of the personality circuits are installed into the network agent 14.

Program instructions that control how the CPU 84 operates are stored in the memory device 86, which can be embodied as RAM, ROM, EPROM, EEPROM or magnetic or optical disk. Instructions and data stored in the memory device 86 are read by the CPU via the bus between the CPU 84 and memory 86 and executed. These instructions cause the CPU to send the aforementioned network agent identifier from the radio transceiver 80 of the network agent 14 to a network 10. They also cause the CPU to cause the radio transceiver 80 to send a network service request from the network agent to the network. When a service grant message is received by the radio transceiver 80, it is read by the CPU. A service grant message is construed by the CPU to be an authorization to access a network service. Depending on the service requested in the service request message, the CPU 84 will employ one or more of the personality circuits and control the user interface to enable a user to access the network service.

The foregoing descriptions are of examples and not of limitations. The scope of the subject matter claimed is defined by the appended claims.

What is claimed is:

1. A method of providing differing services through a single network to a single network agent, the method comprising:
   receiving at a network a network agent identifier from a network agent, wherein the network agent identifier comprises data that identifies the network agent and which identifies to the network a plurality of services that the network agent is eligible to receive through the network;
   receiving at the network a service qualifier for the network agent, wherein the service qualifier is sent to the network from the network agent and identifies to the network a service, of the plurality of services, to be provided to the network agent through the network and that the network agent is entitled to receive, and identifies an account to be associated by the network for the service provided to the network agent, and wherein the service qualifier is determined by the network agent from a password provided by a user to the network agent;
   providing the service comprising a first service through the network to the network agent when the service qualifier is a first service qualifier; and
   providing the service comprising a second service through the network to the network agent when the service qualifier is a second service qualifier.

2. The method of claim 1, wherein the service qualifier sent to the network from the network agent identifies to the network, an account balance of the account to be charged for the service provided to the network agent.

3. The method of claim 1, comprising storing within the network agent, service usage information after a service is provided through the network to the network agent.

4. The method of claim 3, comprising revising the service qualifier for the network agent after a service is provided through the network to the network agent.

5. The method of claim 1, wherein the service qualifier comprises: a DTMF tone; a spoken word; one or more alphanumeric characters; a time of day; a day of the week; a geographic location; a telephone number being called; a network service being requested; an account balance; or any combinations thereof.

6. The method of claim 1, wherein the plurality of services comprise telecommunications services, Internet access, instant messaging service, or audio and video file downloads, or any combinations thereof.

7. A method for a network agent to obtain a first network service and a second network service of a plurality of network services of a single network, the method comprising:
   sending a network agent identifier from a network agent to a network, wherein the network agent identifier comprises data that identifies the network agent and which identifies the network services the network agent is eligible to receive through the network;
   determining at the network agent a network service request from a password provided by a user to the network agent;
   sending the network service request from the network agent to the network, wherein the network service request identifies to the network at least one network service of a plurality of network services to be provided to the network agent through the network and that the network agent is entitled to receive, and identifies to the network one account of a plurality of accounts to be associated by the network for the service provided to the network agent;
   accessing a first network service from the network when the network service request is a first service qualifier; and
   accessing a second network service from the network when the network service request is a second service qualifier.

8. The method of claim 7, comprising cross-referencing at the network agent the password to the one account of the plurality of accounts, wherein the network service request identifies to the network, an account balance of the one account of the plurality of accounts, to be charged for services provided to the network agent.

9. The method of claim 7, comprising storing within the network agent, network service usage information after a network service is provided to the network agent.

10. The method of claim 7, comprising revising the service qualifier for the network agent after a network service is provided to the network agent.

11. The method of claim 7, wherein the service qualifier comprises: a DTMF tone; a spoken word; one or more alphanumeric characters; a time of day; a day of the week; a geographic location; a telephone number being called; a network service being requested; an account number of the one account; an account balance of the one account; or any combinations thereof.

12. A network agent configured to obtain a plurality of network services from a network, the network agent comprising:
- a user interface configured to receive a password entered by a user;
- a communications device capable of wireless communications with a network;
- a processor operatively coupled to the user interface and to the communications device; and
- memory, operatively coupled to the processor, the memory storing a network agent identifier that identifies the network agent, and storing program instructions, which when executed, cause the processor to map the password to a service the network agent is entitled to receive through the network, and to map the password to an account to be associated by the network for the service, and wherein the program instructions when executed, cause the communications device to:
- send the network agent identifier from the network agent to the network, wherein the network agent identifier identifies to the network the services the network agent is eligible to receive through the network;
- send a network service request from the network agent to the network, wherein the network service request identifies to the network the service the network agent is entitled to receive the account;
- access a first service available to the network agent from the network when the network service request is a first service qualifier; and
- access a second service available to the network agent from the network when the network service request is a second service qualifier.

13. The network agent of claim 12, wherein the program instructions cause the communications device to send a network service request that identifies to the network, an account balance of the plurality of accounts, to be charged for by the network for the service provided to the network agent.

14. The network agent of claim 12, wherein the program instructions cause the communications device to send a network service request comprising: a DTMF tone; a spoken word; one or more alphanumeric characters; a time of day; a day of the week; a geographic location; a telephone number being called; a network service being requested; an account number of the account; an account balance of the account; or any combinations thereof.

15. The network agent of claim 12, wherein the network agent comprises a telephone, a cell phone, a personal digital assistant, a personal computer, a laptop computer, subscriber equipment of the network, or an MP3 player, or any combinations thereof.

16. A network that provides wireless services comprised of:
- a switching system that provides network communications services to network agents through a wireless communications network;
- a processor operatively coupled to the switching system;
- memory, operatively coupled to the processor, said memory storing program instructions, which when executed, cause the switching system to:
- receive a network agent identifier from a network agent, wherein the network agent identifier comprises data that identifies the network agent and which identifies network services that the network agent is eligible to receive;
- receive a service qualifier for the network agent from the network agent, wherein the service qualifier identifies to the network one account of a plurality of accounts to be charged by the network for services provided to the network agent, and wherein the service qualifier identifies to the network, services the network agent is entitled to receive through the network;
- provide a first network service to the network agent when the service qualifier is a first service qualifier; and
- provide a second network service to the network agent when the service qualifier is a second service qualifier.

17. The network of claim 16, wherein the program instructions, when executed, cause the switching system to send a service qualifier that identifies to the network, an account balance of a plurality of accounts, to be charged for services provided to the network agent.

18. The network of claim 16, wherein the service qualifier comprises: a DTMF tone; a spoken word; one or more alphanumeric characters; a time of day; a day of the week; a geographic location; a telephone number being called; a network service being requested; an account balance; or any combinations thereof; and
- wherein the service qualifier is comprised of data that identifies the network agent and which identifies network services that the network agent is eligible to receive.

19. The network of claim 16, wherein the network services are comprised of: telecommunications services, Internet access, and instant messaging service.

20. The method of claim 16, wherein the network comprises a single cellular telephone network, and wherein the first network service comprises cellular service for the network agent on the account comprising a first account, and wherein the second network service comprises cellular service for the network agent on the account comprising a second account different than the first account.

21. The method of claim 16, wherein the network agent receives a password at the network agent input by a user, and wherein the network agent maps the password to the account to be identified in the service qualifier received at the switching system from the network agent.

22. The method of claim 1, wherein the first service comprises placing a cellular telephone call on the account comprising a first account, and wherein the second service comprises placing a cellular telephone call on the account comprising a second account.

23. The method of claim 7, wherein the network agent comprises a cellular telephone.

24. The network agent of claim 12, wherein the network agent comprises a cellular telephone.

25. The network agent of claim 12, wherein the communications device comprises a radio transceiver.

26. The method of claim 1, wherein the first service is a different service than the second service.

27. The method of claim 1, wherein the network agent comprises a cell phone, and the network agent identifier comprises a mobile identification number (MIN) of the cell phone and an electronic serial number (ESN) of the cell phone.

28. The method of claim 1, comprising checking at the network that there are sufficient funds in the account to pay for the service, wherein the service qualifier received at the network from the network agent comprises an account number of the account.

29. The method of claim 1, comprising checking at the network that the account is valid.

30. The method of claim 1, wherein the network agent identifier and the service qualifier do not comprise the password.

* * * * *

UNITED STATES PATENT AND TRADEMARK OFFICE
CERTIFICATE OF CORRECTION

| | | |
|---|---|---|
| PATENT NO. | : 9,049,029 B2 | Page 1 of 1 |
| APPLICATION NO. | : 11/413550 | |
| DATED | : June 2, 2015 | |
| INVENTOR(S) | : Antoni Drudis et al. | |

It is certified that error appears in the above-identified patent and that said Letters Patent is hereby corrected as shown below:

Claims

In column 8, line 28 approx., in Claim 20, delete "method" and insert -- network --, therefor.

In column 8, line 35 approx., in Claim 21, delete "method" and insert -- network --, therefor.

Signed and Sealed this
Eighth Day of March, 2016

Michelle K. Lee
*Director of the United States Patent and Trademark Office*